US006665871B1

(12) United States Patent  
Macrae et al.

(10) Patent No.: US 6,665,871 B1
(45) Date of Patent: Dec. 16, 2003

(54) DOWNLOAD SYSTEM FOR CONSUMER ELECTRONIC DEVICES

(75) Inventors: Douglas B. Macrae, Weston, MA (US); Stephen R. Dias, Sudbury, MA (US); Zafar Khan, Chelmsford, MA (US)

(73) Assignee: Index Systems, Inc., Road Town (VG)

(*) Notice: Subject to any disclaimer, the term of this patent is extended or adjusted under 35 U.S.C. 154(b) by 0 days.

(21) Appl. No.: 09/571,518

(22) Filed: May 15, 2000

Related U.S. Application Data (60) Provisional application No. 60/133,971, filed on May 13, 1999.

(51) Int. Cl.$^7$ ............................. G06F 3/00; G06F 13/00; H04N 5/445; H04N 7/16
(52) U.S. Cl. ........................... 725/54; 725/55; 725/141; 348/553; 348/563
(58) Field of Search ........................... 725/54, 55, 140, 725/141, 132, 133, 152, 153, 39, 47, 50, 134, 142; 709/208, 211; 348/522, 553, 558, 460, 563; 434/307 R (56) References Cited

U.S. PATENT DOCUMENTS

| 5,093,921 A | * | 3/1992 | Bevins, Jr. ................... 725/152 |
| 5,355,480 A | | 10/1994 | Smith et al. ................ 395/600 |
| 5,469,206 A | | 11/1995 | Strubbe et al. ................ 348/7 |
| 5,606,443 A | * | 2/1997 | Sgambati ..................... 359/143 |
| 5,657,072 A | | 8/1997 | Aristides et al. .............. 348/13 |
| 5,835,864 A | * | 11/1998 | Diehl et al. .................. 725/140 |
| 5,938,766 A | * | 8/1999 | Anderson et al. ............. 713/100 |
| 5,987,213 A | * | 11/1999 | Mankovitz et al. ........... 386/83 |
| 6,052,556 A | * | 4/2000 | Sampsell ..................... 725/133 |
| 6,154,633 A | * | 11/2000 | Landgraf et al. ............ 725/151 |
| 6,415,023 B2 | * | 7/2002 | Iggulden ................ 379/102.03 |
| 6,452,616 B1 | * | 9/2002 | De Vito et al. .............. 345/825 |
| 6,469,742 B1 | * | 10/2002 | Trovato et al. .............. 348/553 |
| 2001/0013131 A1 | * | 8/2001 | Wang .......................... 725/100 |
| 2001/0037502 A1 | * | 11/2001 | Kamemoto et al. ............ 725/55 |

FOREIGN PATENT DOCUMENTS

| WO | WO 94/13107 | 6/1994 | |
| WO | WO 94/14284 | 6/1994 | |
| WO | WO 200019294 A2 | * 4/2000 | ............ G06F/00/00 |
| WO | WO 200102942 A2 | * 1/2001 | ............. G06F/3/00 |

* cited by examiner

*Primary Examiner*—John Miller
*Assistant Examiner*—Scott Beliveau
(74) *Attorney, Agent, or Firm*—Christie, Parker & Hale, LLP (57) ABSTRACT

A system for reprogramming a consumer electronic device includes a consumer electronic device (CED) having a CED processor and a CED memory and a CED serial port connected to the processor, the memory storing CED processor instructions and CED data. The system also includes a download module having a download processor and a download memory and a download serial port connected to the download processor. The CED processor periodically applies a signal to the CED serial port. When the download serial port is connected to the CED serial port to make a serial connection and the download processor receives one of the periodic signals from the CED processor, the download processor initiates the download of one or more of download instructions and download data from the download memory to the CED memory over the serial connection.

19 Claims, 9 Drawing Sheets

DOWNLOAD SYSTEM FOR CONSUMER ELECTRONIC DEVICES

CROSS-REFERENCE TO RELATED APPLICATION

This application claims priority of U.S. Provisional Application No. 60/133,971 filed May 13, 1999, the disclosure of which is incorporated fully herein.

FIELD OF THE INVENTION

The present invention relates generally to television systems and more particularly, to a physical device for providing program guide information to a television.

BACKGROUND OF THE INVENTION

Historically, only hardcopy television program schedule guides were available. More recently, as illustrated by the Levine Patent, U.S. Pat. No. 4,908,713, television program guides have become available in electronic form. Television program schedule guides have listed the available television programs by day of the week, time of day, channel, and program title.

The earliest versions of on-screen electronic program guides ("EPG") provided for the storage of program schedule information in an electronic memory connected to the television receiver and generally provided for the on-screen formatting and display of the program schedule information on the television screen. The early EPGs typically overlaid the television programming. A network operator is often responsible for downloading the EPG data into a television.

Later EPGs provided viewer-to-EPG interaction improvements and provided Picture-In-Guide ("PIG") display of the television program simultaneous with the display of the EPG. International Application No. PCT/US95/11173 (International Publication No. WO 96/07270), the disclosure of which is incorporated by reference herein for all purposes, illustrates such an improvement.

An EPG receives program information and ancillary information from data encoded onto scan lines of the Vertical Blanking Interval (VBI) of the television signals generated by stations within a data distribution network. The VBI data can be received by a television or a set-top box (STB) equipped to receive the VBI data. Hereinafter, TV/STB represents either a television and/or a set-top box.

In some environments, VBI data may not be available. The G-link cartridge is external to a TV/STB and enables a demonstration of an EPG in an environment where VBI data is not available. Although an EPG may have an internal demonstration mode, which shows sample screens of product features with simulated data, the internal demonstration mode is limited. Tight memory constraints within televisions limits the extent of an internal demonstration mode. Thus, an external demonstration cartridge, i.e., G-link cartridge, can provide an expanded demonstration of EPG features.

SUMMARY OF THE INVENTION

A system for reprogramming a consumer electronic device includes a consumer electronic device (CED) having a CED processor and a CED memory and a CED serial port connected to the processor, the memory storing CED processor instructions and CED data. The system also includes a download module having a download processor and a download memory and a download serial port connected to the download processor. The CED processor periodically applies a signal to the CED serial port. When the download serial port is connected to the CED serial port to make a serial connection and the download processor receives one of the periodic signals from the CED processor, the download processor initiates the download of one or more of download instructions and download data from the download memory to the CED memory over the serial connection. The consumer electronic device can be any consumer electronic device, but usually is a video device, such a television, video recorder, satellite receiver, hard disk video recorder, television set top box of cable box. The download instructions or data may be a demo program or demo data which allow the consumer electronic device to operate in a demonstration mode using the downloaded instructions and/or data. One such demonstration modes demonstrates an interactive electronic program guide, The downloaded instructions and/or data may be downloaded using one or more bootstrap stages which provide the consumer electronic device with technique to download and utilize a final patch load of instructions and/or data.

BRIEF DESCRIPTION OF THE DRAWINGS

FIG. 6 shows the initial screen when the G-link cartridge is plugged in;

DETAILED DESCRIPTION

The G-link cartridge is a physical device which plugs into the back of a TV/STB. One application of the G-link cartridge is the retail environment, such as in a Circuit City store. The G-link cartridge provides simulated data instantly so that a salesperson, for example, can demonstrate an EPG regardless of the store's setup or power supply. Many retailers power down their sales floor on a daily basis with a single switch so maintaining live data with minimal involvement is impossible. When the televisions or set-top boxes are turned off, the EPG loses its downloaded data. The G-link cartridge provides the EPG data that is normally transmitted to the television via the VBI of a television signal. When a TV/STB is sold or removed from the sales floor, the G-link cartridge is removed from the TV/STB. A Velcro patch on the G-link cartridge is useful for attaching/detaching the G-link cartridge to/from a flat surface on the back of the TV/STB.

The G-link cartridge enables television sales people to demonstrate an EPG. The G-link cartridge includes sample channels and information, which when transferred to a TV/STB, shows how an EPG operates and how an EPG appears. The G-link cartridge provides simulated data, to allow retailers the ability to demonstrate an EPG without access to over the air television transmission or a cable television system carrying EPG data. Although, the EPG data is not live data, it does provide an interactive EPG, which enables its users to appreciate the features of an EPG. Thus, sales people and customers can interact with an EPG anytime.

The ability to demonstrate EPG features and functionality is extremely important as a retail marketing tool to support the TV/STB manufacturer and to maximize retail sales of TV/STBs. The G-link cartridge improves the marketing message through the use of improved graphics, interaction, and more in-depth feature explanations. The G-link cartridge provides an expanded demonstration by giving more detailed explanations, additional screens and improved brand identifying graphics. The additional memory provided by the G-link cartridge gives the EPG expanded data capability. The G-link cartridge includes EPG patches and data, which are contained within its non-volatile memory.

Retailers want minimum maintenance to ensure a demonstration is available "on demand" or with a touch of a button. The G-link cartridge, upon detecting when a TV/STB unit has been AC powered on (such as in the morning), sends demonstration cartridge data to the TV/STB.

The G-link cartridge guarantees that an EPG demonstration is available in the retail environment. In a retail environment, it is useful to demonstrate an EPG with canned demonstration data, rather than with live data because it provides a consistent message to all consumers and minimizes sales force training time. "Canned demonstration data" is the phrase used to describe the channel lineup and programming data that are stored in the G-link cartridge, as opposed to data received from a broadcast television signal.

Provided that canned demonstration data is desired, it would be a waste of broadcast bandwidth to download such demonstration data via the VBI. It is wasteful to broadcast "demo pictures," illustrations and diagrams that are useful in a retail setting but are worthless to the end users of a live broadcast. In addition, the downloading of EPG data via the VBI is prone to network operator error. In short, allowing retail TV/STB units to run off of VBI patches and data would be a waste of bandwidth and would be prone to network operator errors. In any case, most consumer electronics stores do not have live feeds, consequently, canned EPG data is needed to demonstrate an EPG.

The G-link cartridge has data and instructions for the EPG. In the preferred embodiment of the invention, the cartridge's data and instructions resides on the cartridge's ROM and is sent to the TV/STB over a G-Link bus as a "G-link patch." It is a patch because many of the EPG's functions exist in the TV/STB memory prior to the G-link patch being transferred to the TV/STB. The G-link patch sends incremental functions for the EPG. In an alternative embodiment of the invention, the cartridge's data and instructions may reside on any kind of non-volatile memory and may be sent over any kind of bus that interfaces with a TV/STB unit.

Essentially the patching scheme deployed in the G-link cartridge is different from the usual VBI patching scheme. The G-link cartridge patch download from the G-link cartridge to the TV/STB is a 3-stage bootstrap process: (1) an initial bootstrap; (2) a final bootstrap; and (3) a patch load.

Each stage provides items that are used in the next stage. The preceding stage must be successfully completed before the next one can begin. The TV/STB acts as the master and the G-link cartridge acts as the slave.

Figure 1:
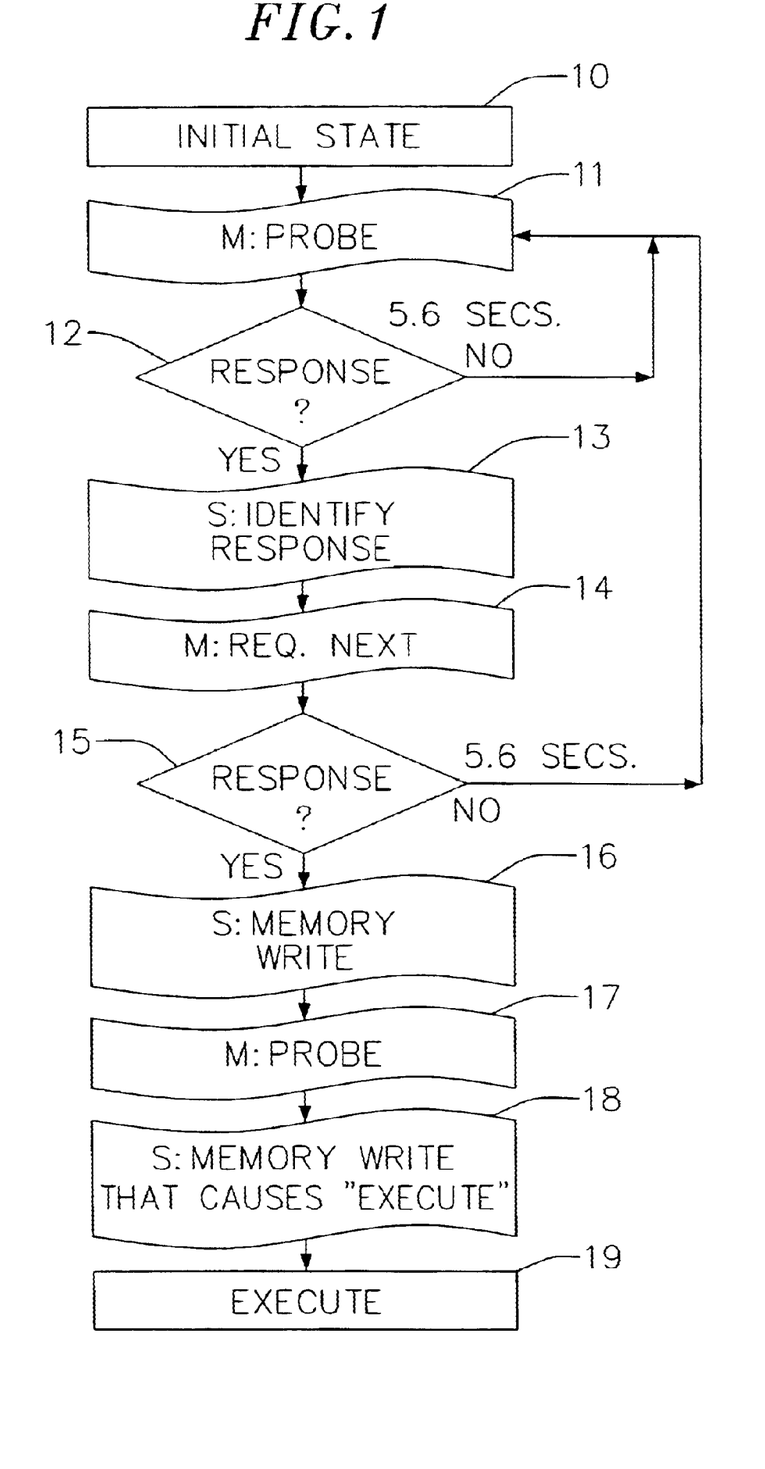
FIG. 1 shows the initial bootstrap stage.

The initial bootstrap stage provides the essential tools used in the Stage 2, Final Bootstrap. FIG. 1 shows the initial bootstrap stage. After the successful completion of the initial bootstrap stage, the following items are available for use in the next stage: Faster probe packets (every 0.5 seconds), Watchdog timer, and End of stage packet handler.

At the beginning of the initial bootstrap stage, the G-link cartridge is in its initial state 10. The TV/STB, which is a G-link master device, routinely sends to the G-link cartridge, a probe request packet 11 that looks for the presence of a G-link slave device. In a preferred embodiment of the invention, if the TV/STB determines within 5.6 seconds 12 that the G-link cartridge is present, then the G-link cartridge sends an identify response packet 13. The TV/STB requests the next packet from the G-link cartridge 14. In a preferred embodiment of the invention, if the G-link cartridge responds within 5.6 seconds to the next packet request 15, then the G-link cartridge does a memory write to its memory 16. The TV/STB sends another probe request packet to the G-link cartridge 17. The G-link cartridge does a memory write to the TV/STB that causes the TV/STB to "execute" the instructions within the memory write 18. The TV/STB executes the instructions contained within the memory write from the G-link cartridge 19.

Figure 2:
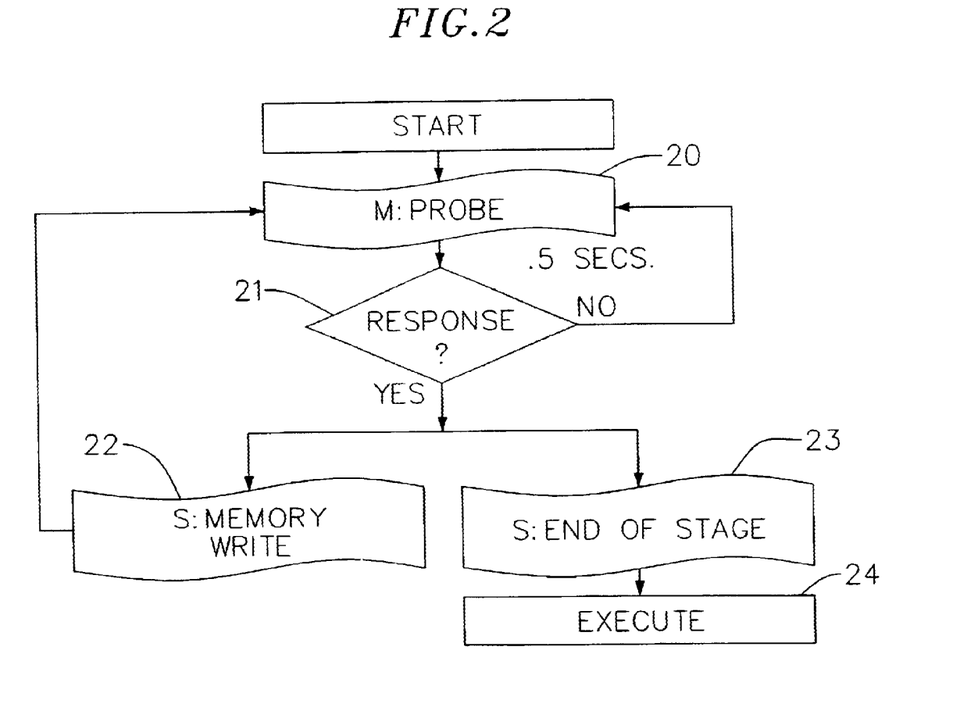
FIG. 2 shows the final bootstrap stage.

The final bootstrap stage provides the patch information that is loaded in the third stage. FIG. 2 shows the final bootstrap stage. After the successful completion of the final bootstrap stage, the following items are available: TV screen display that shows real-time download percent complete, watchdog timer (replaces watchdog timer from stage 1), Get Next packet (suppresses Probe packets from stage 1), End of stage packet handler (replaces End of stage packet from stage 1), Retry packet, and size of a final patch.

At the beginning of the final bootstrap stage, the TV/STB sends a probe request packet to the G-link cartridge 20. In a preferred embodiment of the invention, the TV/STB determines within 0.5 seconds whether the G-link cartridge has responded to the TV/STB 21. If the G-link cartridge does respond within 0.5 seconds, then the G-link cartridge does a memory write 22 until the end of the final bootstrap stage 23. At the end of the final bootstrap stage, the instruction within the memory writes are executed by the TV/STB 24.

Figure 3:
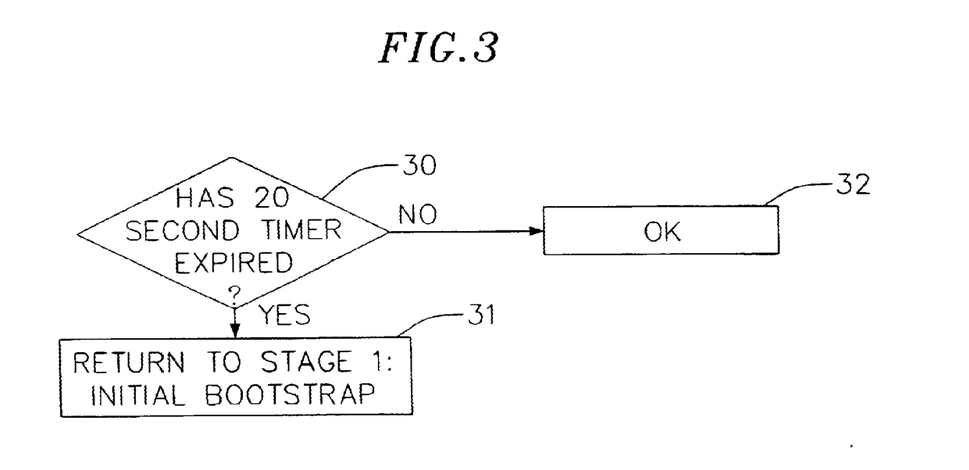
FIG. 3 shows the 20-second timer flowchart.

FIG. 3 shows the 20-second timer flowchart, which is applicable in a preferred embodiment of the invention. During the final bootstrap stage, if a 20-second timer expires 30, then the bootstrap process returns to the initial bootstrap stage 31, otherwise the bootstrap process is proceeding properly 32.

Figure 4:
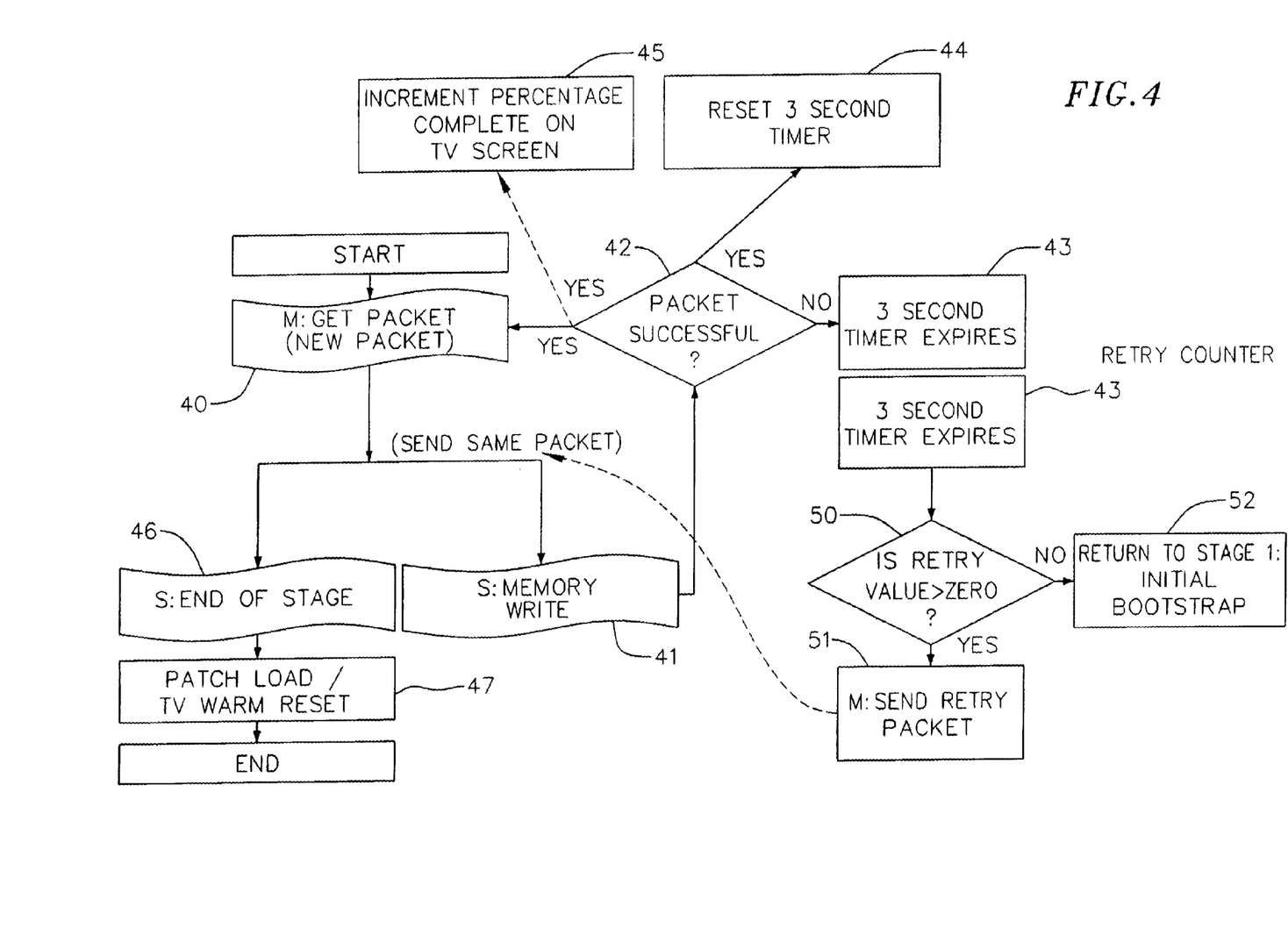
FIG. 4 shows the patch load stage.

FIG. 4 shows the patch load stage. The patch load stage arranges the information from the first two stages into usable patch code. At the beginning of the patch load stage, the TV/STB gets a new packet from the G-link cartridge 40. The G-link cartridge does a memory write from its memory to the TV/STB 41. The TV/STB determines whether the packet has been successfully received by the TV/STB within a timer period 42. In the preferred embodiment of the invention, the timer period is three seconds. If the timer period expires 43, then the packet was not successfully transferred from the G-link cartridge to the TV/STB. If the packet is determined to be successfully received, then the timer period is reset 44, the displayed percentage completed on the television screen is incremented 45, and the TV/STB gets the next packet from the G-link cartridge 40. When the patch load end of stage is reached 46, the TV/STB goes into a patch load warm reset state. When the timer period expires 43, then the TV/STB determines whether a retry counter is greater than zero 50. The retry counter represents the number of times the TV/STB will retry a packet request because of the timer period expiration. If the retry counter is greater than zero, then the TV/STB will request another packet from the G-link cartridge 51. If the retry counter is not greater than zero, then the retry counter has been exhausted and the bootstrap process returns to stage 1, the Initial Bootstrap stage 52.

The G-link cartridge detects whether the TV/STB is a legacy product or a new product by examining a self-identification string from the TV/STB. This allows multiple G-link cartridge software versions to be put onto the same G-link cartridge memory. The appropriate version is sent from the G-link cartridge to the TV/STB when the TV/STB unit is identified.

After the code from the G-link cartridge has been downloaded into the TV/STB, the G-link cartridge monitors the G-Link bus to detect a reset of the EPG. If such a reset is detected, the G-link cartridge sends the patch again. The reset feature makes the system more robust. The download protocol is made robust, by incorporating retries, timeouts etc.

A G-link cartridge software version includes an auto-demo mode and/or an interactive demo mode. The auto-demo mode is an auto-looped presentation of an EPG's features. This mode is not interactive. Screens on the television change automatically, thereby allowing the viewer to sit back and enjoy the show without having to enter any input. The auto-demo mode may be restarted by the viewer at any time. A continuous auto-demo modem, which also may be activated by the viewer, provides a continuous automated demonstration. The demonstration is automatically restarted once it is ended. In interactive demo mode, the sales person or the customer can test-drive the EPG using the G-link cartridge sample channels and programs. The interactive demo mode has a timeout feature that upon expiration of a time period, the interactive demo mode terminates and the auto-demo is activated.

Once the G-Link cartridge is connected, the television will display a demonstration banner from which the demonstration can be activated. When the demonstration is activated, the demonstration will consist of display screens with pre-loaded simulated television programming data, along with text box overlays to provide narrative descriptions and visual examples of EPG product features.

The G-link cartridge is designed to allow the viewer (a retailer or potential purchaser) to interrupt the demonstration and "interact" with the product (with the pre-loaded, simulated data). Following a period of no activity (no buttons pressed), a timeout occurs and the beginning of the demonstration is restarted. When the demonstration is finished, the television will return to its normal viewing mode with a small demonstration banner appearing at the bottom of the screen. This banner is intended to visually communicate that the television is equipped with an EPG and that a demonstration is available.

The G-link demonstration may also be activated through the Manufacturer's menus.

Selecting the "Continuous Demonstration" menu item will activate the G-link demonstration in a continuous mode. It can be exited by pressing the same button that will exit the internal continuous demo.

The retailer needs to follow very few steps to install the G-link cartridge in order to make the cartridge extremely simple—literally "plug and play." In order for the G-link cartridge to be "plug and play," the setup must consist of no more than inserting the cartridge's G-link cable into the G-link port on the rear of the television, powering up the cartridge, and downloading the data into the television. The retailer is not required or expected to enter the regular Guide setup screens.

Figure 5:
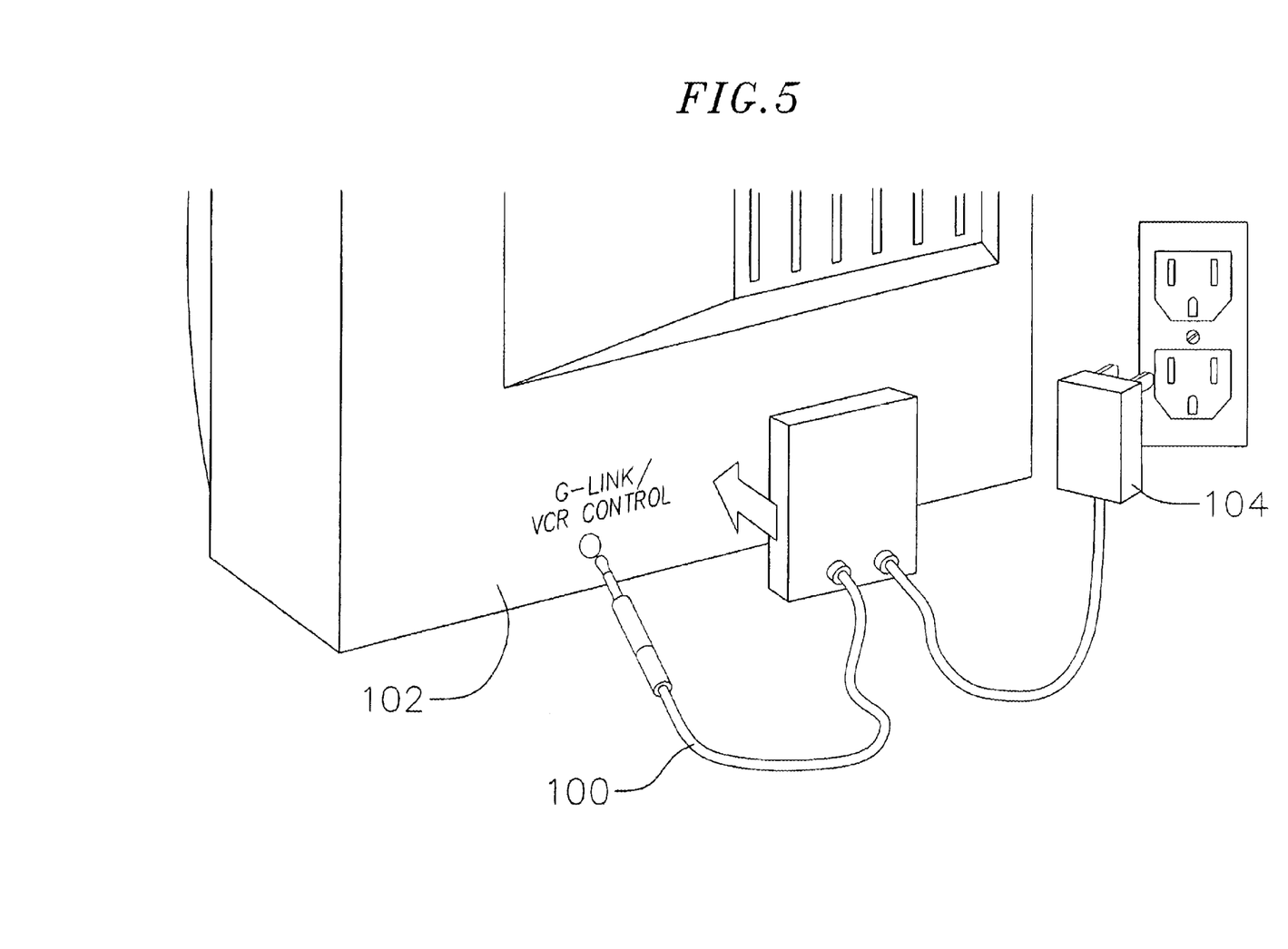
FIG. 5 depicts the G-link cartridge with AC-DC power converter, connector, and G-link television port.
Figure 5A:
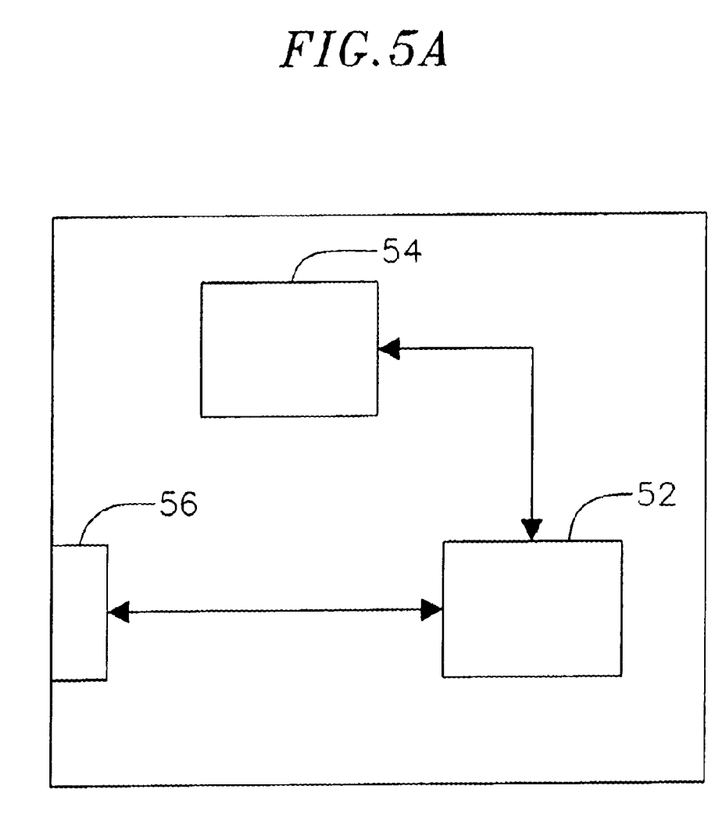

FIG. 5 depicts the G-link cartridge with AC-DC power converter, connector, and G-link television port. The television port may reside anywhere on the television depending upon a given manufacturer's television design. In an alternative embodiment of the invention, the G-link cartridge can also be connected to an EPG equipped set-top box.

In the preferred embodiment of the invention, the G-link cartridge setup includes the following:

(1) unplugging the TV/STB;

(2) plugging the G-link connector 100 into an input on the back of an EPG equipped TV/STB 102;

(3) plugging an AC-to-DC power converter 104 into an AC outlet;

(4) plugging in the television and/or set-top box;

(5) the following information is displayed on the television screen: an EPG logo appears on the television screen, providing visual confirmation that the G-link cartridge is connected correctly; meanwhile the demonstration data loads from the cartridge to the television and a message is displayed on the television indicating that data is being loaded; and a Progress Bar with % completion, providing an on-screen indication of how much of the data loading has been completed (e.g., 32% completed, 48% completed, 65% completed, etc.);

(6) once the demonstration data is fully loaded, the TV/STB goes to regular TV/STB viewing mode and a Demonstration Banner appears at the bottom of the screen and a prompt will appear on the television screen indicating how to start the demonstration; and (7) When the GUIDE button on the remote control is pressed, the Demonstration mode is activated and the demonstration begins.

In the preferred embodiment of the invention, the connector 100 is an infrared (IR) extender device. In an alternative embodiment of the invention, the connector uses other means of communication, such as radio frequencies (RF). In the preferred embodiment of the invention, the port into which the connector is input, is a G-link. G-link is the location where the IR extender device is connected. G-link is also the port and serial communication protocol that allows a G-link cartridge to talk to an EPG board and firmware.

Once the G-link cartridge is installed, attempting to enter Set up through the manufacturer's menus or the Factory Test will activate the demonstration. In an exemplary embodiment of the invention, the demonstration will also be activated by pressing the VCR Plus+key.

Figure 6:
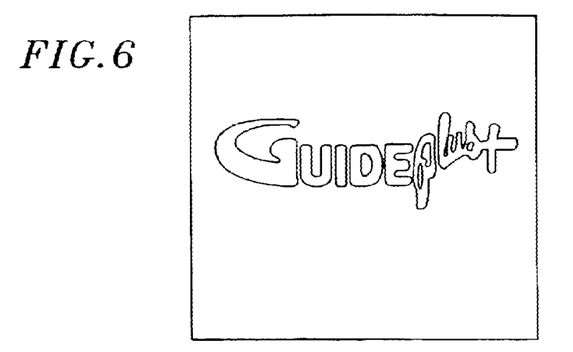

FIGS. 6–10 show setup screens in an exemplary embodiment of the invention. They are screen samples of the demonstrations. FIG. 6 shows the initial screen when the G-link cartridge is plugged in. The initial screen indicates that the cartridge is installed correctly.

Figure 7:
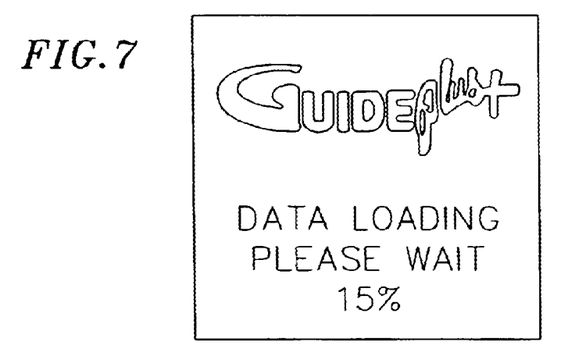
FIG. 7 shows the screen when the data begins downloading from the G-link cartridge.
Figure 8:
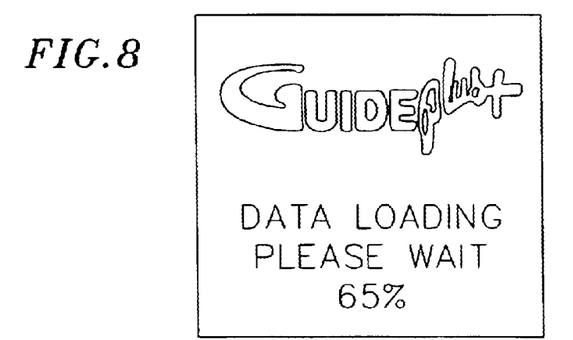
FIG. 8 shows the screen after 65% of the data has been loaded into the TV/STB.
Figure 9:
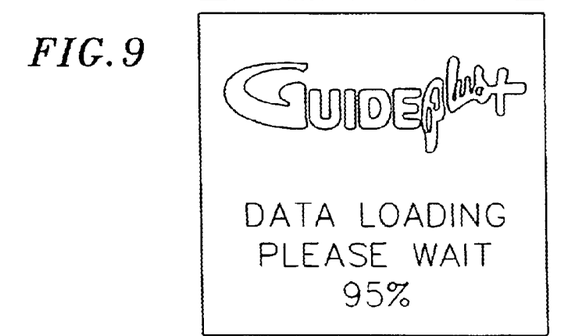
FIG. 9 shows the screen after 95% of the data has been loaded into the TV/STB.
Figure 10:
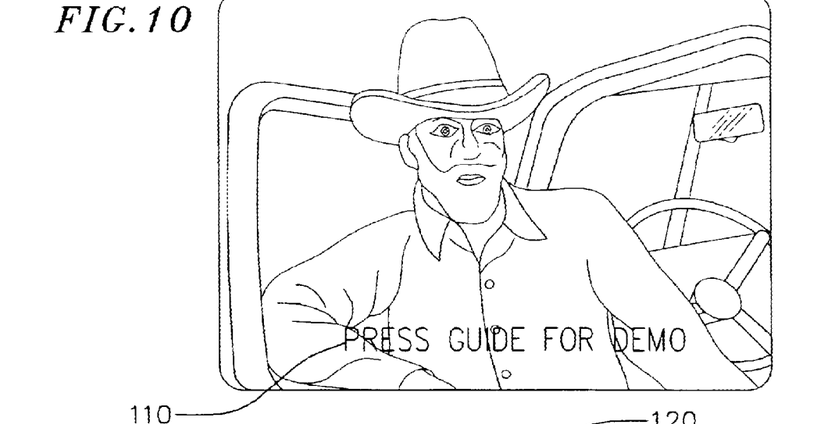
FIG. 10 shows a screen where the data has finished loading into the TV/STB.

FIG. 7 shows the screen when the data begins downloading from the G-link cartridge. The data loading message indicates that there will be a delay before the demonstration begins. A progress bar with percent complete should be displayed until the data loading is complete. FIG. 8 shows the screen after 65% of the data has been loaded into the TV/STB. FIG. 9 shows the screen after 95% of the data has been loaded into the TV/STB. FIG. 10 shows a screen where the data has finished loading into the TV/STB. When the data has finished loading, the TV/STB returns to a television watching mode and the Demonstration Banner is displayed on the television. The Demonstration Banner consists of the GUIDE Plus+logo and the text "Press GUIDE for Demo" 110. The word "GUIDE" will appear overlaying a button bitmap. When the GUIDE button on the remote control is pressed, the demonstration is activated.

In the preferred embodiment of the invention, all of the demonstration data is loaded into the TV/STB initially. In an alternative embodiment of the invention, different demonstration data can be loaded into the TV/STB based on user input or the state of the EPG. The state of the EPG can be a function of the screens entered, time of day, user input, etc.

The G-link cartridge must remain connected to the TV/STB to keep the demonstration active because the demonstration data will be lost on a system reset. The most likely, but not necessarily the only cause for such a reset is that the TV/STB loses power for an extended period of time, which is common in a retail environment where power is often turned off every evening.

If AC power is turned off, the demonstration data will automatically reload when it is turned back on provided that the G-link cartridge is attached to the TV/STB. Thus, if power is turned off in the evening, the demonstration data will be automatically reloaded when power is turned back on the morning.

Canned Demonstration Data

The television stores one set of data, either "canned" or "live." It cannot maintain both sets of data in the television RAM simultaneously. An EPG setup requires a user to enter information such as zip code, TV/STB brand, etc. In order to provide a satisfactory product demonstration without requiring a retailer to go through an EPG setup, the G-link cartridge enables a demonstration that will display only the canned TV programming data. This is the only way to guarantee a full set of useful data for the demonstration, as retail locations very often do not provide an adequate VBI feed.

In the preferred embodiment of the invention, the demonstration data will comprise the following components:

26 channels of programing will be included. The following channels in this order are required:
    an ABC, FOX, CBS, NBC, UPN, WB, PBS, CBC, American Movie Classics, BET, Cinemax, CNBC, The Discovery Channel, Disney, ESPN, ESPN 2, fX, The History Channel, HBO, Lifetime, MSNBC, Nickelodeon, Sci-Fi, TNT, Univision and USA. These channels are being selected specifically because of their broad national distribution as well as their content and propensity for interesting descriptions.
  2 days of titles and descriptions for all 26 channels and an additional five days of titles and descriptions for the Sort categories (Movies, Sports, Children's) will be stored. The "current time" when the demonstration is started will be Wednesday, 8:00 P.M.
  The data provides minimal "dating" of content.
  The clock in the Picture-in-picture (PIP) will be replaced with "Simulated <call letters>." While in the demonstration mode, the video displayed in the PIP will not correspond to the data in the EPG since the EPG data is canned (and often the video will be laser disk video). Because of this, the video presented in the PIP will be whatever video is being broadcast to the TV during the time the demonstration is running. This could cause confusion, therefore, the PIP will "note" that the data is simulated throughout the demonstration. This will be executed via an overlay on the PIP as shown in FIG. 11.

Figure 11:
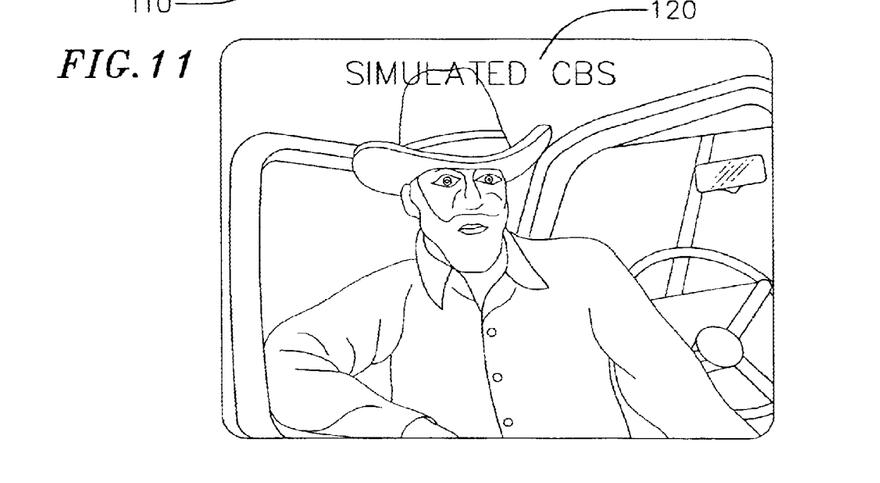
FIG. 11 shows the "Simulated <call letters>" where the call letters are "CBS"

FIG. 11 shows the "Simulated <call letters>" where the call letters are "CBS" 120. The call letters will match what is highlighted in the EPG or the channel to which the guide is locked in the demonstration.

Interactivity

Once the G-link cartridge is installed and the data is loaded, a potential viewer/buyer knows that the television is EPG equipped via an on-screen prompt. The on-screen prompt is part of a Demonstration Banner at the bottom of the television screen. To start the demonstration, the viewer simply presses the GUIDE button, as indicated in the prompt. This is the first level of "interactivity" in the demonstration.

In the preferred embodiment of the invention, the Demonstration Banner is approximately ¼ the width of the screen. It will start in the bottom/center of the screen. To reduce burn-in on the television screen, it will be necessary to move it's location every few minutes.

The demonstration is designed to be extensively interactive. The viewer is able to interrupt the demonstration and sample various EPG screens. Canned data allows the viewer to access and use the functionality demonstrated. At any time during the demonstration, the viewer may press any of the buttons the EPG recognizes (for example: Guide, OK, up, down, left, right, info, menu, PIP, or a digit key) on the remote to interrupt the Demonstration and activate the Interactive Guide mode. When this happens, the Grid screen will appear defaulting to the locked PIP mode (since the video cannot be changed). There will be prompts during the demonstration that suggest to the viewer to interrupt the demonstration and use the features and functions described in the demo.

If the demonstration mode is entered from the Manufacturer's menu while the G-link cartridge is connected, the demonstration activated will be the external demonstration cartridge version. This demonstration will be continuous and non-interactive. This mode may be desirable when set up on an end cap ("end cap" is a retail term. It refers to the end of a product aisle, which is considered a premium location for product to be displayed) or a location not easily reached by a sales associate or customer.

The following table lists remote keys and what will occur in the preferred embodiment of the invention while in the G-link cartridge is connected.

| Mode (following the installation of the demonstration cartridge) | Key | Result |
| --- | --- | --- |
| TV Viewing Mode | Guide, VCR Plus+ | Demonstration will be activated and Demo will begin to show screens in sequential order |
| TV Viewing Mode | All others | Will perform the way they normally would with TV Viewing |

| Mode (following the installation of the demonstration cartridge) | Key | Result |
|---|---|---|
| Demonstration Mode | Guide Recognized Keys (Guide, OK, up, down, left, right, info, menu, PIP, or a digit key) | Demonstration will be interrupted and the Interactive Mode will begin. The viewer may now "interact" with the Guide using the canned data. |
| Demonstration Mode | Volume + or − | Will work normally |
| Demonstration Mode | Clear | Demo will be exited and TV mode will be activated. The demo banner will be displayed. |
| Demonstration Mode | All other remote keys | Do nothing |
| Interactive Mode | Guide | Demonstration will be reactivated at the beginning and replay. |
| Interactive Mode | All Others | Will perform the way they normally would during Guide Mode but data will be simulated. If the OK/Select/Enter button is pressed, video will be displayed with a text overlay indicating the video is simulated and what show and channel would have appeared if the viewer was at home. |

Figure 12:
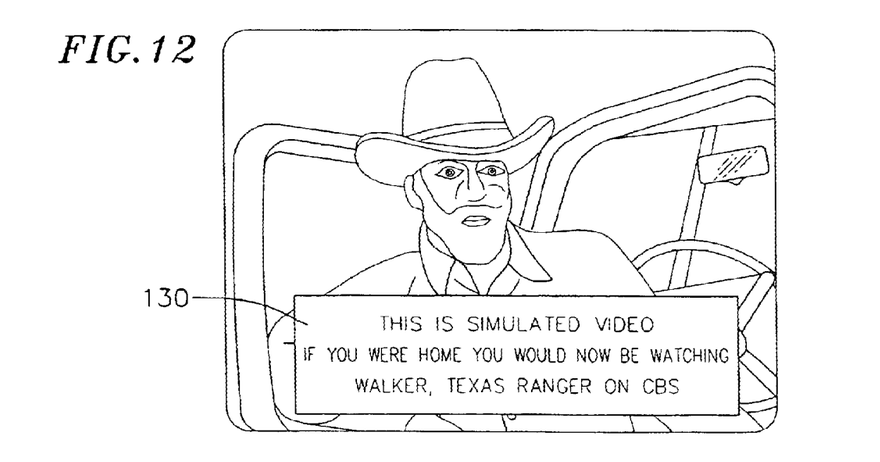
FIG. 12 shows an overlay message, which indicates that the video is simulated and that the viewer would be watching, "<Show title> on <call letters>," if the viewer were at home.
Figure 13:
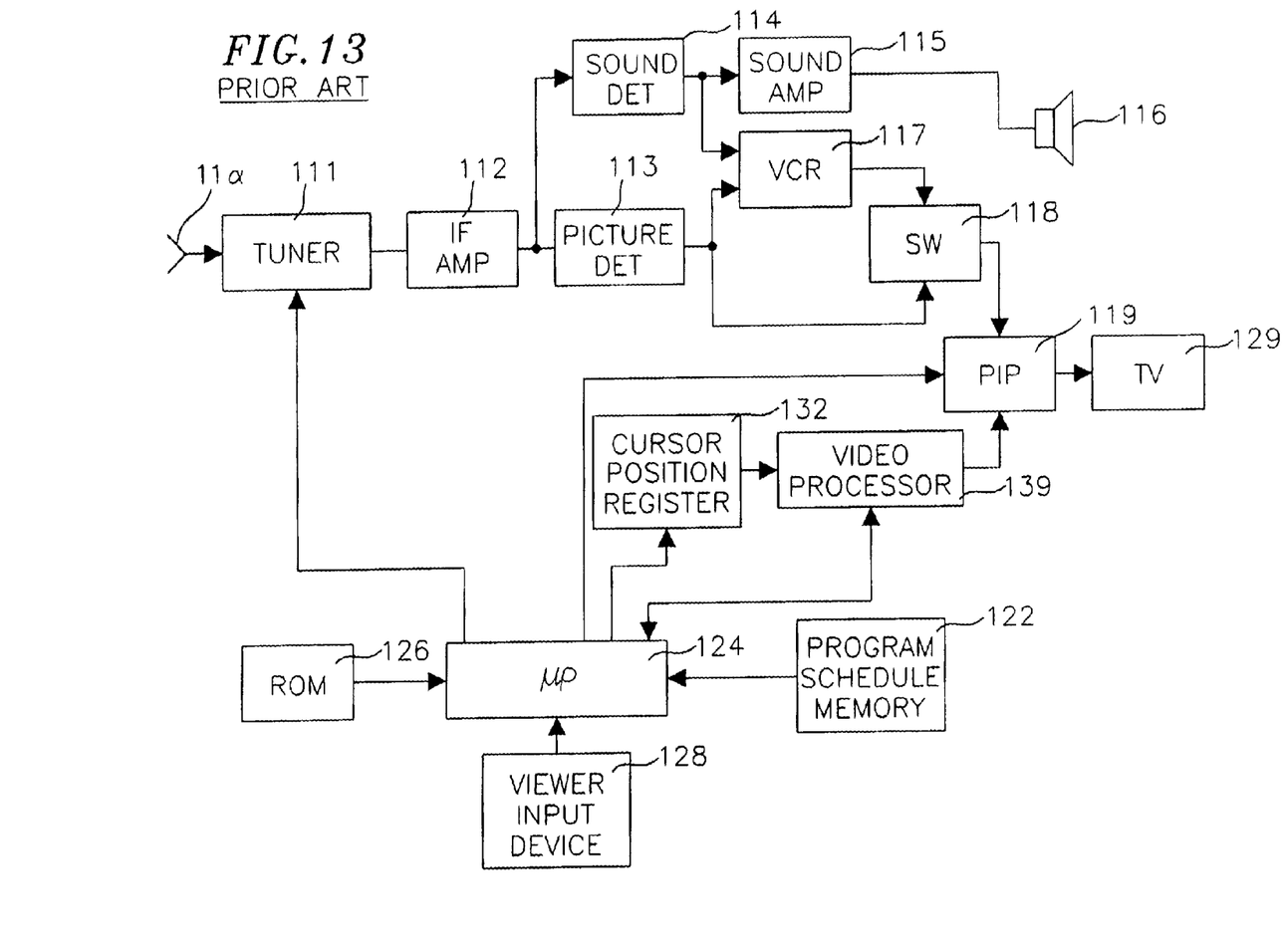
Figure 14:
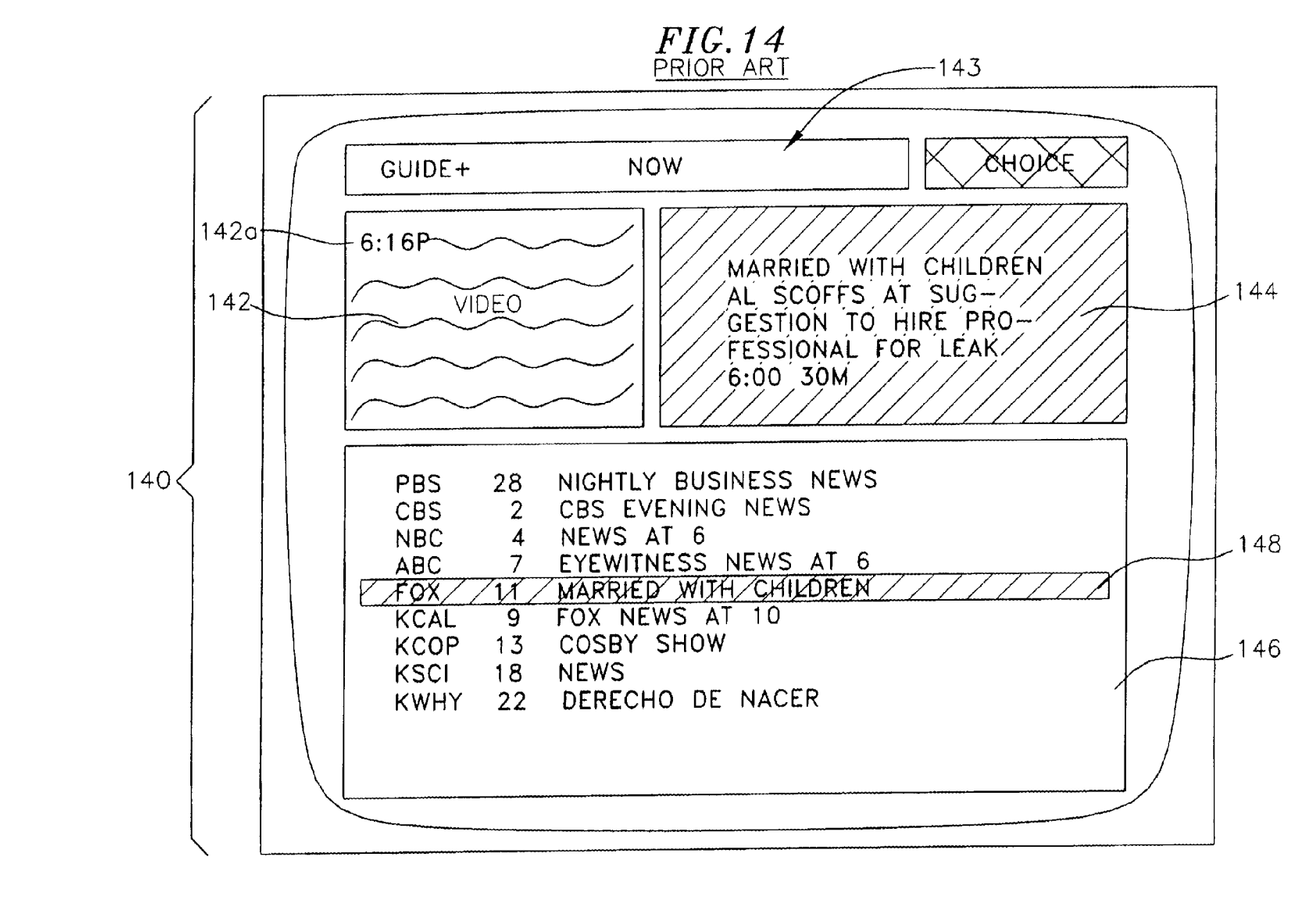

There are video overlays in the Interactive Mode. While in Interactive Mode, pressing the OK/Enter/Select button will drop the Guide and display the video supplied to the TV. FIG. 12 shows an overlay message, which indicates that the video is simulated and that the viewer would be watching "<Show title> on <call letters>" if the viewer were at home 130. In FIG. 12 the show title is "Walker, Texas Ranger," and the call letters are CBS.

Timeouts

A television has a manufacturer's time out. The demonstration overrides the manufacturer's time out to avoid the demonstration failing to complete.

The demonstration has an Interactive Mode Timeout. Once in interactive mode, if there are no buttons pressed after a period of time, a timeout will return the viewer back to the beginning of the demonstration and the demonstration will continue until it is completed.

The demonstration can be "interrupted" and the EPG "test driven" an unlimited number of times. When the demonstration is complete, the TV/STB will return to TV viewing mode and the EPG Demonstration Banner will return to the bottom of the screen.

Manufacturer Specific Screens, Text, Functionality and Customization

Screens will be manufacturer specific and therefore may look slightly different. Additionally, text may require slight variations by manufacturer to accommodate different buttons labels, etc. Consequently, there are manufacturer ID code triggers for text differences, screen differences and functionality differences.

Although differences in "look and feel" and EPG functionality will be addressed with manufacturer ID code triggers, a manufacturer may want to include their logos in the demonstration. Graphic customization by original equipment manufacturers (OEMs) will be limited to logo/text displays in predefined areas of the demonstration, likely limited to one splash screen at the beginning of the demonstration.

On-Screen "Look and Feel"

The demonstration will include overlay boxes. Each function demonstrated will be presented with an on-screen text box describing its functionality. To accomplish this, there may be multiple "actions" or events. (For example, a screen will be presented, an overlay box with text will be wiped into the screen, then following a predetermined timeout period, the text box and copy are wiped off the screen from left to right.)

The overlay box will be solid in color (light yellow with a solid black border) and will be sized for the copy. Its location on the screen will be determined by what is being demonstrated and what should or could be covered up. The demonstration begins with a dark blue screen with a product logo and features list. This screen is repeated at the end of the demonstration along with two call to action screens (pick up the remote and try the guide instructions). These are the only places where the text box and copy colors vary.

The demonstration simulates product usage. Several screens may be strung together to give the simulated appearance of using the product. An example of this is using the "sort" function to find a particular theme movie. The sequence of screens would first include the main sort screen, an overlay box describing the functionality, then a second screen would display what appears on the screen when "Movies" are selected from the screen, the third screen would display a simulated selection of "All," the fourth screen would display a simulated listing of all the movies available.

In alternative embodiments of the invention, various colors can be used for text. In the preferred embodiment of the invention, when the text is in the text boxes, it will be black. In addition, the text on the introductory screens and the closing call to action screens will be white.

A font different from that used in EPG must be downloaded from the G-link cartridge to be used in the text boxes of the external demonstration. The font recommendation is Tekton (Regular, not the italic version).

Some graphics may be used to enhance the external demonstration. Some graphics that may be incorporated include full screen EPG and OEM logos, and small, icon-like graphics to enhance the text boxes.

Animation can be used at certain points in the demonstration to enhance the demonstration and increase the entertainment value of the demonstration. Logos or other graphics may be used in an animated format.

What is claimed is:

1. A system for reprogramming a consumer electronic device comprising:
   a consumer electronic device (CED) having a CED processor and a CED memory and a CED serial port connected to the processor, the memory storing CED processor instructions and CED data; and
   a download module configured as a slave to the consumer electronic device and local to the consumer electronic device having a download processor, a download memory and a download serial port connected to the download processor, wherein the CED processor periodically applies a signal to the CED serial port, and when the download serial port is connected to the CED serial port to make a local serial connection and when the download processor receives one of the periodic signals from the CED processor over the local serial connection, the download processor initiates the download of one or more of download instructions and download data from the download memory to the CED memory over the local serial connection, and wherein the one or more of download instructions and download data comprises one or more of a demonstration program and a set of demonstration data that is used by the CED processor to generate a demonstration on the consumer electronic device.

2. The system of claim 1 wherein the CED returns to a normal operation mode, when the demonstration on the CED is completed.

3. The system of claim 1 further comprising a user input device for sending commands to the CED, wherein the demonstration program downloaded to the CED memory is activated when an activation command is sent from the user input device to the CED.

4. The system of claim 1 further comprising a user input device for sending user commands to the CED, wherein particular download instructions and download data are downloaded to the CED, responsive to the user commands.

5. A system for reprogramming a consumer electronic device comprising:

a consumer electronic device (CED) having a CED processor and a CED memory and a CED serial port connected to the processor, the memory storing CED processor instructions and CED data; and a download module configured as a slave to the consumer electronic device and local to the consumer electronic device having a download processor, a download memory and a download serial port connected to the download processor, wherein the CED processor periodically applies a signal to the CED serial port, and when the download serial port is connected to the CED serial port to make a local serial connection and when the download processor receives one of the periodic signals from the CED processor over the local serial connection, the download processor initiates the download of one or more of download instructions and download data from the download memory to the CED memory over the local serial connection, and wherein the one or more of download instructions and download data comprises a demonstration interactive electronic program guide.

6. A system for reprogramming a consumer electronic device comprising:

a consumer electronic device (CED) having a CED processor and a CED memory and a CED serial port connected to the processor, the memory storing CED processor instructions and CED data, wherein the CED serial port is configured to interface to a plurality of consumer devices when any of the plurality of consumer devices is connected to the CED serial port; and a download module configured as a slave to the consumer electronic device and local to the consumer electronic device having a download processor, a download memory having download instructions and download data pre-stored therein, and a download serial port connected to the download processor, wherein the CED processor periodically applies a signal to the CED serial port, and wherein, when the download serial port is connected to the CED serial port to make a local serial connection and when the download processor receives one of the periodic signals from the CED processor over the local serial connection, the download processor initiates the download of one or more of the download instructions and the download data from the download memory to the CED memory over the local serial connection.

7. The system of claim 6 wherein the one or more of download instructions and download data comprises a bootstrap download and a patch download.

8. The system of claim 6 wherein the consumer electronic device is a television.

9. The system of claim 6 wherein the consumer electronic device is a video recorder.

10. The system of claim 6 wherein the consumer electronic device is a television set top box.

11. The system of claim 6 wherein the consumer electronic device is a hard disk video recorder.

12. The system of claim 6 wherein the consumer electronic device is a satellite receiver.

13. The system of claim 6 wherein the consumer electronic device is a cable box.

14. The system of claim 6 wherein the one or more of download instructions and download data comprises an auto-demo electronic program guide.

15. The system of claim 6 wherein the download module includes means for detecting identification of the CED and for downloading particular download instructions and download data to the CED, responsive to the detected identification of the CED.

16. The system of claim 6 further comprising means for displaying a visual confirmation that the download module is correctly connected to the CED, on a CED display screen.

17. The system of claim 6 further comprising means for displaying a download progress bar on a CED display screen.

18. The system of claim 6 further comprising means for displaying a demonstration banner on a CED display screen when the download is completed.

19. The system of claim 6 wherein the download memory is a non-volatile memory.

* * * * *